(12) United States Patent
Lee

(10) Patent No.: US 12,152,979 B2
(45) Date of Patent: Nov. 26, 2024

(54) IMAGE SENSOR PACKAGE, SYSTEM, AND METHOD FOR COUNTING FINE PARTICLES BY USING VIRTUAL GRID LINE

(71) Applicant: SOL INC., Seoul (KR)

(72) Inventor: Jong Muk Lee, Seoul (KR)

(73) Assignee: SOL INC., Seoul (KR)

( * ) Notice: Subject to any disclaimer, the term of this patent is extended or adjusted under 35 U.S.C. 154(b) by 417 days.

(21) Appl. No.: 17/520,107

(22) Filed: Nov. 5, 2021

(65) Prior Publication Data
US 2022/0113242 A1    Apr. 14, 2022

Related U.S. Application Data

(63) Continuation of application No. PCT/KR2020/002695, filed on Feb. 25, 2020.

(30) Foreign Application Priority Data

May 7, 2019   (KR) .................. 10-2019-0053012

(51) Int. Cl.
*G01N 15/10*    (2024.01)
*G01N 15/14*    (2024.01)
(Continued)

(52) U.S. Cl.
CPC ..... *G01N 15/1433* (2024.01); *G01N 15/1012* (2013.01); *G01N 15/1434* (2013.01);
(Continued)

(58) Field of Classification Search
CPC ............... G01N 15/01; G01N 15/1012; G01N 15/1433; G01N 15/1434;
(Continued)

(56) References Cited

U.S. PATENT DOCUMENTS

2008/0290435 A1* 11/2008 Oliver ............... H01L 27/14632
                                                          438/65
2009/0175530 A1*  7/2009 Sjostrom ............... G06T 7/0004
                                                         382/152
(Continued)

FOREIGN PATENT DOCUMENTS

JP    H09-159612 A    6/1997
JP    3571348 B2      9/2004
(Continued)

OTHER PUBLICATIONS

Shima Nezhadbadeh,"Integrated Chirped-Grating Spectrometer-on-a-Chip,"Nov. 14, 2019, Optical Science and Engineering ETDS, University of Mexico , pp. 64-77.*

(Continued)

*Primary Examiner* — Omar S Ismail
(74) *Attorney, Agent, or Firm* — Studebaker & Brackett PC

(57) ABSTRACT

An image sensor package, a system, and a method for counting fine particles by using a virtual grid line are provided. The image sensor package includes an image sensor array, a grid pattern layer formed on an outer area of the image sensor array and including a plurality of protruding patterns spaced apart from each other while protruding toward the central area of the image sensor array to form a virtual grid line, a dam pattern layer formed on the grid pattern layer, having a specific height, and configured to form a channel or a chamber for receiving the fine particles to be counted, and a cover glass formed on the dam pattern layer.

20 Claims, 16 Drawing Sheets

(51) Int. Cl.
  *G01N 15/1433* (2024.01)
  *G01N 15/1434* (2024.01)
  *G06T 11/20* (2006.01)
  *G01N 15/01* (2024.01)
(52) U.S. Cl.
  CPC ............ *G06T 11/206* (2013.01); *G01N 15/01* (2024.01); *G01N 2015/144* (2013.01); *G01N 2015/1486* (2013.01)
(58) Field of Classification Search
  CPC ..... G01N 2015/1006; G01N 2015/144; G01N 2015/1486; G06T 11/206
  See application file for complete search history.

(56) References Cited

U.S. PATENT DOCUMENTS

| | | | | |
|---|---|---|---|---|
| 2010/0008580 | A1* | 1/2010 | Mizuno | G06T 3/4069 382/284 |
| 2010/0045816 | A1* | 2/2010 | Rhoads | G06V 10/24 348/222.1 |
| 2011/0007172 | A1* | 1/2011 | Miceli | H04N 9/3147 348/222.1 |
| 2011/0026141 | A1* | 2/2011 | Barrows | H01L 31/1876 359/737 |
| 2011/0205388 | A1* | 8/2011 | Iwane | H04N 23/672 348/222.1 |
| 2011/0255770 | A1* | 10/2011 | Touya | G06T 7/0006 382/144 |
| 2012/0274568 | A1* | 11/2012 | Lenchenkov | G03H 1/0005 359/22 |
| 2013/0250095 | A1* | 9/2013 | Inoue | G06T 7/001 348/94 |
| 2014/0092227 | A1* | 4/2014 | Kanamori | A61B 1/07 348/68 |
| 2014/0192411 | A1* | 7/2014 | Hirata | G02B 1/14 359/513 |
| 2015/0138541 | A1* | 5/2015 | Nukada | G01N 21/956 359/813 |
| 2015/0155320 | A1* | 6/2015 | Chien | H01L 27/14629 257/432 |
| 2016/0039164 | A1* | 2/2016 | Tuczek | B31D 3/005 428/116 |
| 2016/0153959 | A1 | 6/2016 | Vojnovic et al. | |
| 2017/0176614 | A1* | 6/2017 | Alhukail | G01V 1/32 |
| 2017/0278881 | A1* | 9/2017 | Hsu | H01L 27/14685 |
| 2018/0089903 | A1* | 3/2018 | Pang | H04N 23/45 |
| 2018/0097867 | A1* | 4/2018 | Pang | H04N 5/2226 |
| 2018/0136515 | A1* | 5/2018 | Nam | G02B 5/3058 |
| 2018/0190690 | A1* | 7/2018 | Lee | H01L 27/1462 |
| 2018/0349663 | A1* | 12/2018 | Garlepp | G06V 40/1306 |
| 2018/0356678 | A1* | 12/2018 | Kim | G02F 1/133516 |
| 2019/0011882 | A1* | 1/2019 | Gusyatin | G01N 15/1433 |
| 2019/0296060 | A1* | 9/2019 | Oh | H01L 27/1463 |
| 2019/0373096 | A1* | 12/2019 | Shim | G06F 1/1626 |

FOREIGN PATENT DOCUMENTS

| | | |
|---|---|---|
| KR | 10-2005-0009612 A | 1/2005 |
| KR | 10-2010-0104261 A | 9/2010 |
| KR | 10-2014-0088432 A | 7/2014 |

OTHER PUBLICATIONS

Hai Jiang,"A Novel Lab-on-chip System for Counting Particles/Cells Based on Electrokinetically-induced Pressure-driven Flow and Dual-wavelength Fluorescent Detection,"Dec. 10, 2013,http://hdl.handle.net/10012/8068, pp. 22-70.*

International Search Report issued in PCT/KR2020/002695; mailed Aug. 31, 2020.

* cited by examiner

IMAGE SENSOR PACKAGE, SYSTEM, AND METHOD FOR COUNTING FINE PARTICLES BY USING VIRTUAL GRID LINE

CROSS-REFERENCE TO RELATED APPLICATIONS

The present application is a continuation of International Patent Application No. PCT/KR2020/002695, filed on Feb. 25, 2020, which is based upon and claims the benefit of priority to Korean Patent Application No. 10-2019-0053012 filed on May 7, 2019. The disclosures of the above-listed applications are hereby incorporated by reference herein in their entirety.

BACKGROUND

Embodiments of the inventive concept described herein relate to an image sensor package, a system, and a method for counting fine particles by using a virtual grid line.

A cell counter is used to count fine particles such as cells. According to a method for counting cells by using a conventional cell counter, cells are placed in a counting chamber having the height of about 100 μm, a user personally counts the cells according to a specific rule based on a grid pattern provided on the cell counter by using a microscope, or a computer automatically counts the cells.

However, as the grid pattern provided on the conventional cell counter is formed through printing or laser machining, the cells may be partially covered by the grid pattern, and the boundary serving as a reference for counting the cells may become unclear.

In addition, the conventional cell counter is manufactured through a typical molding process or injection-molding process. The manufacturing variation of 1-20 μm or more is made between cell counters manufactured through the molding process or the injection-molding process. When fine cells are counted, the manufacturing variation of 1-20 μm or more is a relatively greater value, thereby degrading the accuracy in counting the cells.

SUMMARY

Embodiments of the inventive concept provide an image sensor package, a system, and a method for counting fine particles by using a virtual grid line.

The objects of the inventive concept are not limited to the above, but other effects, which are not mentioned, will be apparently understood to those skilled in the art.

According to an embodiment, an image sensor package for counting fine particles by using a virtual grid line includes an image sensor array, a grid pattern layer formed on an outer area of the image sensor array and including a plurality of protruding patterns spaced apart from each other by a specific distance while protruding toward a central area of the image sensor array to form a virtual grid line, a dam pattern layer formed on the grid pattern layer, having a specific height, and forming a channel or a chamber for receiving the fine particles to be counted, and a cover glass formed on the dam pattern layer.

According to an embodiment, the protruding pattern of the grid pattern layer to form the virtual grid line includes a fine pattern to correct the virtual grid line.

According to an embodiment, the fine pattern to correct the virtual grid line is provided in a form in which an occupied area is gradually reduced at specific distances.

According to an embodiment, the fine pattern to correct the virtual grid line is provided in a shape of stairs formed at specific distances.

According to an embodiment, the specific distances of the fine pattern to correct the virtual grid line is less than a pixel width of the image sensor array.

According to an embodiment, the grid pattern layer to form the virtual grid line further includes a body pattern formed in a rectangular shape on the outer area of the image sensor array, and the plurality of protruding patterns are formed to extend from the body pattern.

According to an embodiment, the plurality of protruding patterns of the grid pattern layer to form the virtual grid line are formed to extend from at least one inner side surface of a plurality of inner side surfaces of the body pattern.

According to an embodiment, the image sensor array is a lens-free image sensor array.

According to an embodiment, a middle glass interposed between the grid pattern layer and the dam pattern layer is further included.

According to an embodiment, the middle glass has a bottom surface, which faces the grid pattern layer, coated with an optical filter.

According to an embodiment, the middle glass has a top surface which is bio-surface treated and faces the dam pattern layer.

According to an embodiment, a system for counting fine particles by using a virtual grid line includes an image sensor package to count the fine particles and an image processing device. The image sensor package to count the fine particles includes an image sensor array, a grid pattern layer formed on an outer area of the image sensor array, and including a plurality of protruding patterns spaced apart from each other by a specific distance while protruding toward a central area of the image sensor array to form a virtual grid line, a dam pattern layer formed on the grid pattern layer, having a specific height, and forming a channel or a chamber for receiving the fine particles to be counted, and ca over glass formed on the dam pattern layer. The image processing device includes a particle image receiving unit to receive a fine particle image generated by the image sensor array, a grid pattern layer extracting unit to extract a grid pattern layer to form the virtual grid line of the fine particle image, and a counting image generating unit to form the virtual grid line in the fine particle image, based on the grid pattern layer, which is to form the extracted virtual grid line to generate a fine particle counting image.

According to an embodiment, the protruding pattern of the grid pattern layer to form the virtual grid line includes a fine pattern to correct the virtual grid line.

According to an embodiment, the fine pattern to correct the virtual grid line is provided in a form in which an occupied area is gradually reduced at specific distances.

According to an embodiment, the fine pattern to correct the virtual grid line is provided in a shape of stairs formed at specific distances.

According to an embodiment, the specific distances of the fine pattern to correct the virtual grid line is less than a pixel width of the image sensor array.

According to an embodiment, the grid pattern layer extracting unit extracts a fine pattern of the grid pattern layer by using sensing data of the fine particle image.

According to an embodiment, the counting image generating unit forms the virtual grid line in the fine particle image, based further on the fine pattern of the grid pattern layer.

According to an embodiment, the grid pattern layer to form the virtual grid line further includes a body pattern formed in a rectangular shape on the outer area of the image sensor array, and the plurality of protruding patterns are formed to extend from the body pattern.

According to an embodiment, the plurality of protruding patterns of the grid pattern layer to form the virtual grid line are formed to extend from at least one inner side surface of a plurality of inner side surfaces of the body pattern.

According to an embodiment, the image sensor array is a lens-free image sensor array.

According to an embodiment, a middle glass interposed between the grid pattern layer and the dam pattern layer is further included.

According to an embodiment, the middle glass has a bottom surface, which faces the grid pattern layer, coated with an optical filter.

According to an embodiment, the middle glass has a top surface which is bio-surface treated and faces the dam pattern layer.

According to an embodiment, the system further includes an automatic counting unit to count the fine particles in a specific unit space defined by the virtual grid line by analyzing the fine particle counting image.

According to an embodiment, a method for counting fine particles by using a virtual grid line, in which the fine particles is counted by using an image sensor package through a computer, includes receiving a fine particle image generated by the image sensor package including an image sensor array, a grid pattern layer, a dam pattern layer, and a cover glass, extracting the grid pattern layer on the image sensor package, based on the fine particle image, and generating a fine particle counting image to form a virtual grid line in the fine particle image.

According to an embodiment, the method further includes previously performing a calibration operation to determine a position of the grid pattern layer, by receiving sensing data of the grid pattern layer.

According to an embodiment, the method further includes counting the fine particles in a specific unit space defined by the virtual grid line by analyzing the fine particle counting image.

The details of the inventive concept are included in the detailed description and drawings.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
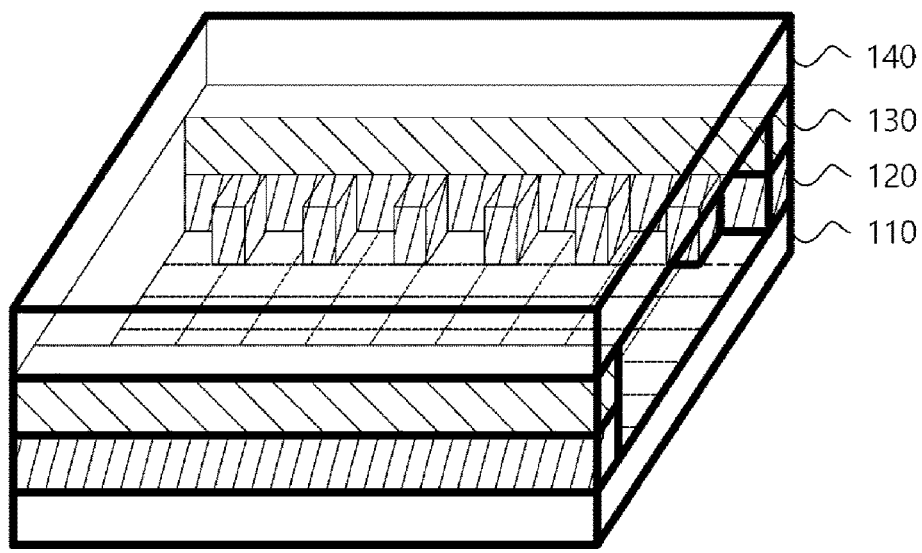
FIG. 1 is a perspective view schematically illustrating an image sensor package, according to an embodiment of the inventive concept.

Advantage points and features of the inventive concept and a method of accomplishing thereof will become apparent from the following description with reference to the following figures, wherein embodiments will be described in detail with reference to the accompanying drawings. However, the inventive concept may be embodied in various different forms, and should not be construed as being limited only to the illustrated embodiments. Rather, these embodiments are provided as examples so that the inventive concept will be thorough and complete, and will allow those skilled in the art to fully understand the scope of the inventive concept. The inventive concept may be defined by scope of the claims.

The terminology used herein is provided for explaining embodiments, but the inventive concept is not limited thereto. As used herein, the singular terms "an" and "the" are intended to include the plural forms as well, unless the context clearly indicates otherwise. Furthermore, it will be further understood that the terms "comprises", "comprising," "includes" and/or "including", when used herein, specify the presence of stated elements, steps, operations, and/or devices, but do not preclude the presence or addition of one or more other components, steps, operations and/or devices. The same reference numerals will be assigned to the same component throughout the whole specification, and "and/or" refers to that components described include not only individual components, but at least one combination of the components. It will be understood that, although the terms "first", "second", etc., may be used herein to describe various components, these components should not be limited by these terms. These terms are only used to distinguish one component from another component. Thus, a first component to be described below may be a second component without departing from the teachings of the inventive concept.

Unless otherwise defined, all terms (including technical and scientific terms) used herein have the same meaning as commonly understood by those skilled in the art. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Spatially relative terms, such as "below", "beneath", "lower", "above", "upper", and the like, may be used herein to make it easier to describe the relationship between one component and another component. It will be understood that the spatially relative terms are intended to encompass different orientations of the device in use or operation in addition to the orientation depicted in the figures. For example, when a device illustrated in accompanying drawings is reversed, a device provided 'below' or 'beneath' another device may be placed 'above' another device. Accordingly, the term "below" may include both concepts of "below" and "above. A device may be oriented in a different direction. Accordingly, terminology having relatively spatial concepts may be variously interpreted depending on orientations.

Hereinafter, embodiments of the inventive concept will be described with reference to accompanying drawings.

FIG. 1 is a perspective view schematically illustrating an image sensor package, according to an embodiment of the inventive concept.

Referring to FIG. 1, an image sensor package 100 includes an image sensor array 110, a grid pattern layer 120, a dam pattern layer 130, and a cover glass 140.

The image sensor array 110 serves as a lens-free image sensor array, and light incident onto the image sensor package 100 is incident onto the image sensor array 110 without passing through an additional lens (for example, an objective lens of a microscope or a camera lens). Hereinafter, a method for sensing fine particles 40 present on the image sensor package 100 will be described in brief. Light is incident onto the image sensor package 100, and light, which is blocked or transmitted at a specific proportion by fine particles 40 or other materials (the grid pattern layer 120 to be described later) present on the image sensor package 100, is incident onto the image sensor array 110. The image sensor array 110 senses the fine particles 40 or the other materials present on the image sensor package 100, based on the incident light. A light source, such as a parallel light source or a light source having pin holes, having regularity may be used.

The fine particles 40 refer to objects to be detected (hereinafter referred to as an "object"), which are injected or inserted into the image sensor package 100. For example, the fine particles 40 may include cells, micro-plastics, green algae, or seaweed. Accordingly, according to the inventive concept, the image sensor package 100 may be used to sense the object in an environmental pollution measurement field and in a vitro diagnosis field, as well as living cells.

The image sensor array 110, which is an area including a plurality of pixels 10, is an area to sense light incident onto the image sensor package 100. Each pixel 10 is an element to sense the light incident onto the image sensor package 100. A wiring area, which is formed on the same substrate as the substrate for the image sensor array 110 and includes a wire and various circuits connected to the image sensor array 110, may be provided outside the image sensor array 110.

The grid pattern layer 120 is formed at an outer area, which is adjacent to the wiring area, of the image sensor array 110 to face the central area of the image sensor array 110. In other words, at least one area of the grid pattern layer 120 may be formed on the specific number of lines of the pixels 10 in the outer area, which is adjacent to the wiring area, of the image sensor array 110. For example, the grid pattern layer 120 may be formed on the lines of the pixels 10 corresponding to an edge of the outer area. The number of lines of the pixels 10, on which the grid pattern layer 120 is formed, may be determined depending on the design of the image sensor package 100 or a process rule. Facing the central area of the image sensor array 110 refers to that a protruding pattern 121 of the grid pattern layer 120, to be described below, protrudes toward the central area of the image sensor array 110.

The grid pattern layer 120 includes a plurality of protruding patterns 121 spaced apart from each other by a specific distance while protruding. Each of the plurality of protruding patterns 121 serves as a reference for forming a virtual grid line 30 to be described.

The dam pattern layer 130 is formed on the grid pattern layer 120. The height of the channel or chamber of the image sensor package 100 is formed by the dam pattern layer 130.

The cover glass 140 is formed on the dam pattern layer 130. The cover glass 140 formed on the dam pattern layer 130 refers to that the cover glass 140 includes the dam pattern layer 130 to cover the channel or the chamber of the image sensor package 100. Accordingly, the channel or the chamber of the image sensor package 100 is formed by the image sensor array 110, the grid pattern layer 120, the dam pattern layer 130, and the cover glass 140. The cover glass 140 includes a transparent material for transmitting light incident onto the image sensor package 100.

According to the inventive concept, the image sensor package 100 may be fabricated through a semiconductor process. Accordingly, the difference from a target value may be more reduced when the process is completed, as compared to the cell counter manufactured through the molding process or the injection-molding process. The error in counting the fine particles 40 may be more reduced by using the image sensor package 100 reduced in process variation.

In this case, the cover glass 140 may be formed on the dam pattern layer 130 through the semiconductor process, or may be formed on the dam pattern layer 130 by a user, when the image sensor package 100 is used. When the cover glass 140 is formed on the dam pattern layer 130 through the semiconductor process, the user may inject or insert a sample including fine particles into the channel or the chamber of the image sensor package 100 through an injection port of the image sensor package 100. Meanwhile, when the image sensor package 100 is used, and when the cover glass 140 is formed on the dam pattern layer 130 by the user, the user may inject or insert the sample including the fine particles into the channel or chamber of the image sensor package 100 in a state where the cover glass 140 is not present, and may cover the cover glass 140 on the dam pattern layer 130.

Figure 2:
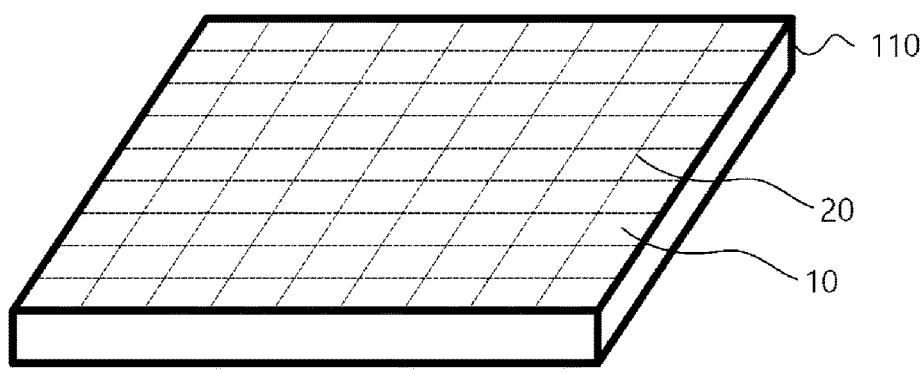
FIG. 2 is a perspective view schematically illustrating an image sensor of FIG. 1.
Figure 3:
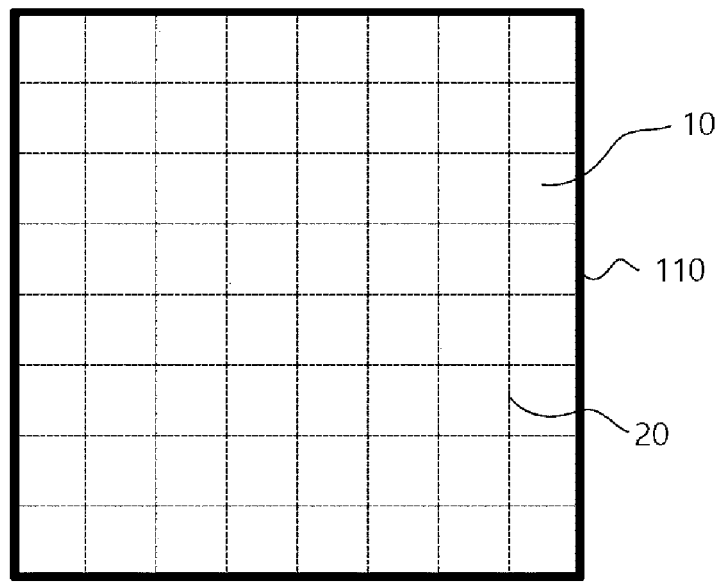
FIG. 3 is a plan view schematically illustrating the image sensor of FIG. 1.

FIG. 2 is a perspective view schematically illustrating an image sensor of FIG. 1, and FIG. 3 is a plan view schematically illustrating the image sensor of FIG. 1.

Referring to FIGS. 2 and 3, the image sensor array 110 may include the plurality of pixels 10, and the plurality of pixels 10 are separated from each other by a pixel separating line 20. The pixel separating line 20 is a virtual line to separate the plurality of pixels 10 from each other in a horizontal direction or vertical direction.

Figure 4:
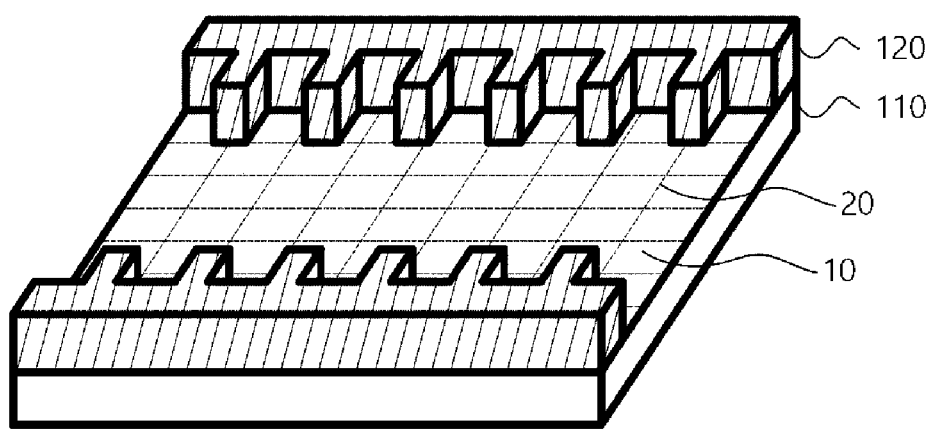
FIG. 4 is a perspective view schematically illustrating the structure in which a grid pattern layer is stacked on the image sensor of FIG. 1.
Figure 5:
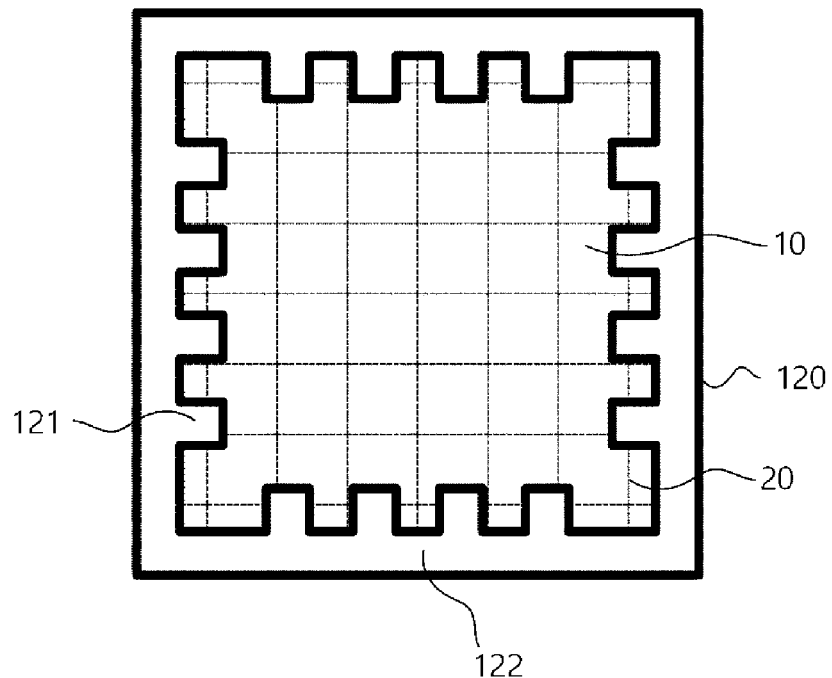
FIG. 5 is a plan view illustrating the structure in which a grid pattern layer is stacked on an image sensor of FIG. 1.

FIG. 4 is a perspective view schematically illustrating the structure in which a grid pattern layer is stacked on an image sensor array of FIG. 1, and FIG. 5 is a plan view illustrating the structure in which a grid pattern layer is stacked on the image sensor array of FIG. 1.

Referring to FIGS. 4 and 5, the grid pattern layer 120 is stacked on the image sensor array 110. One area of the grid pattern layer 120 is formed on an outer area of at least one of a horizontal plane or a vertical plane of the image sensor array 110. For example, the grid pattern layer 120 may be formed in one outer area of the horizontal plane and one outer area of the vertical plane of the image sensor array 110. A horizontal line and a vertical line of the virtual grid line 30 may be formed based on the protruding pattern 121 of the grid pattern layer 120 by merely forming the grid pattern layer 120 on one outer area of the horizontal plane of the image sensor array 110 and one outer area of the vertical plane of the image sensor array 110.

The grid pattern layer 120 includes the protruding pattern 121 and a body pattern 122. The protruding pattern 121 includes a plurality of patterns formed toward the central area of the image sensor array 110. The body pattern 122 is a pattern formed in a rectangular shape on the outer area of the image sensor array 110. The plurality of protruding patterns 121 are formed to extend from the body pattern 122. In other words, the plurality of protruding patterns 121 are formed to extend from at least one inner surface of a plurality of inner surfaces of the body pattern 122.

The body pattern 122 may be formed on the wiring area or on the outer area, which is adjacent to the wiring area, of the image sensor array 110. However, at least one area of each of the plurality of protrusion patterns 121 should be formed on the outer area of the image sensor array 110. The reason that the at least one area of each of the plurality of protrusion patterns 121 should be formed on the outer area of the image sensor array 110, is because the image sensor array 110 should obtain data on a reference for forming the virtual grid line 30 to be described later by sensing the plurality of virtual grid lines 30. That the image sensor array 110 senses the plurality of protruding patterns 121 refers to that the light incident onto the image sensor package 100 is blocked by the plurality of protruding patterns 121, or the image sensor array 110 senses the intensity of light reduced by the specific proportion. The image sensor array 110 obtains data for the reference forming the virtual grid line 30 by sensing the intensity of the light blocked or reduced by the protruding pattern 121.

Figure 6:
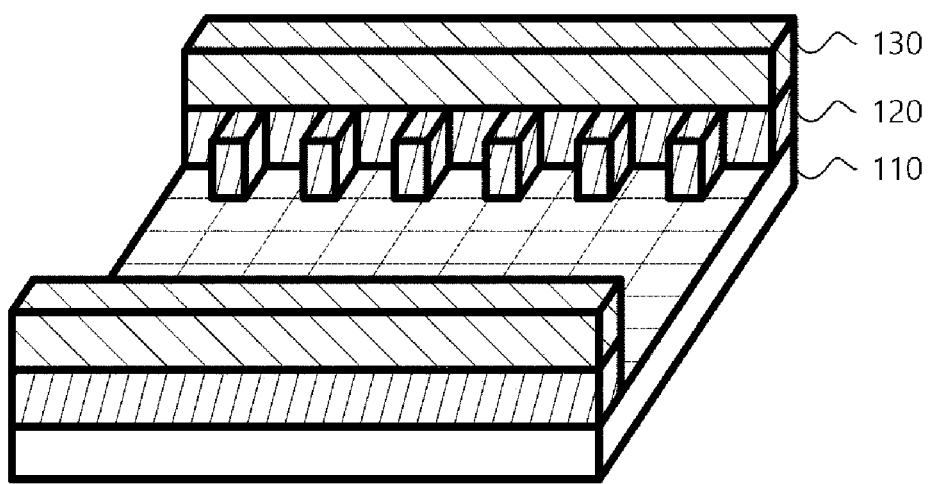
FIG. 6 is a perspective view illustrating the structure in which a dam pattern layer is stacked on a grid pattern layer of FIG. 1.
Figure 7:
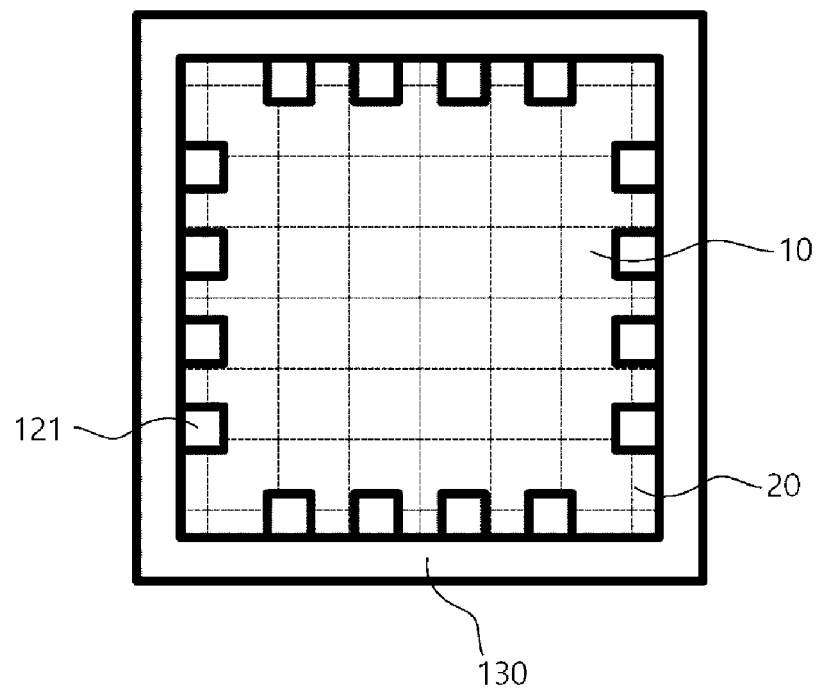
FIG. 7 is a plan view illustrating the structure in which a dam pattern layer is stacked on the grid pattern layer of FIG. 1.

FIG. 6 is a perspective view illustrating that a dam pattern layer is stacked on a grid pattern layer of FIG. 1, and FIG. 7 is a plan view illustrating that a dam pattern layer is stacked on a grid pattern layer of FIG. 1.

Referring to FIGS. 6 and 7, the dam pattern layer 130 is formed on the grid pattern layer 120. That the dam pattern layer 130 is formed on the grid pattern layer 120 refers to that the dam pattern layer 130 is formed on at least one area of the body pattern 122 of the grid pattern layer 120. In addition, the dam pattern layer 130 has a specific height, and the height of the channel or chamber of the image sensor package 100 is formed by the specific height of the dam pattern layer 130. In other words, the height of the channel or chamber of the image sensor package 100 is determined to correspond to the height of the dam pattern layer 130. For example, when the height of the grid pattern layer 120 is 1 μm, the height of the dam pattern layer 130 should be 99 μm in order for the channel or chamber of the image sensor package 100 to be formed to be 100 μm. In other words, the most part of the height of the channel or chamber of the image sensor package 100 may be determined by the height of the dam pattern layer 130.

Although not illustrated in FIGS. 6 and 7, the dam pattern layer 130 may be formed in the same shape as that of the grid pattern layer 120.

The dam pattern layer 130 may have a shape in which at least one area is opened. The open area of the dam pattern layer 130 may be an injection area (not illustrated) into which the fine particles 40 are injected.

Figure 8:
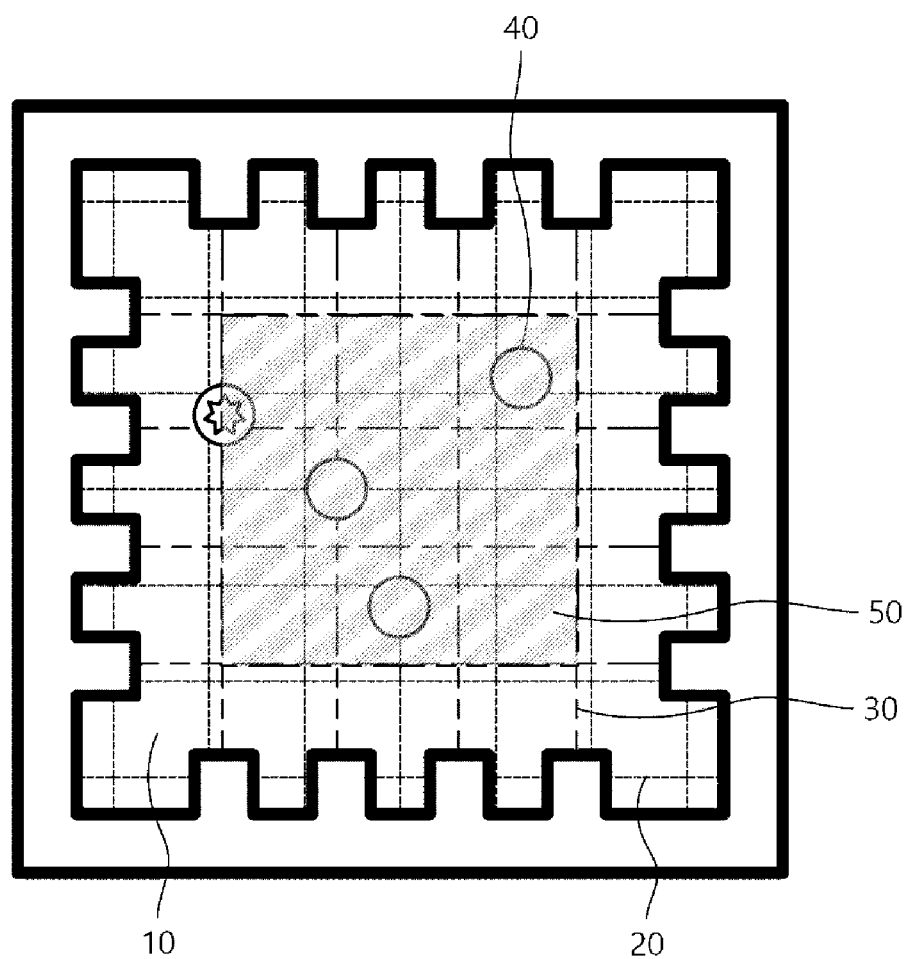
FIG. 8 is a view illustrating fine particles and a virtual grid line.

FIG. 8 is a view illustrating fine particles and virtual grid lines.

Referring to FIG. 8, the fine particles 40 and the virtual grid lines 30 are illustrated on the channel or chamber of the image sensor package 100.

The virtual grid line 30 is a virtual line that serves as a reference for counting the fine particles 40 on the image sensor array 110. A system 1000 for counting the fine particles to be described later counts the fine particles 40 on a virtual grid area 50 which is defined by the virtual grid line 30. In other words, the fine particles 40 present on the virtual grid area 50 are counted, and the fine particles 40 outside the virtual grid area 50 are not counted. Accordingly, the fine particles 40 in a specific unit area (virtual grid area 50) are counted.

However, when the fine particles 40 are positioned across the virtual grid line 30 (the fine particles 40 marked in the shape of a star as in FIG. 8), the fine particles 40 should be counted according to a specific rule. For example, the fine particles 40 are determined as being in the virtual grid area or out of the virtual grid area, depending on the position, the shape, or the area size occupied by the fine particles 40 on the virtual grid line, such that the fine particles 40 are counted or not counted. Alternatively, the inner size of the virtual grid area 50 of the fine particles 40 may be calculated to count the fine particles 40 in the form of the number of decimal points. Accordingly, it is very important to determine the position of the virtual grid line serving as the reference for counting the fine particles 40.

Figure 9A:
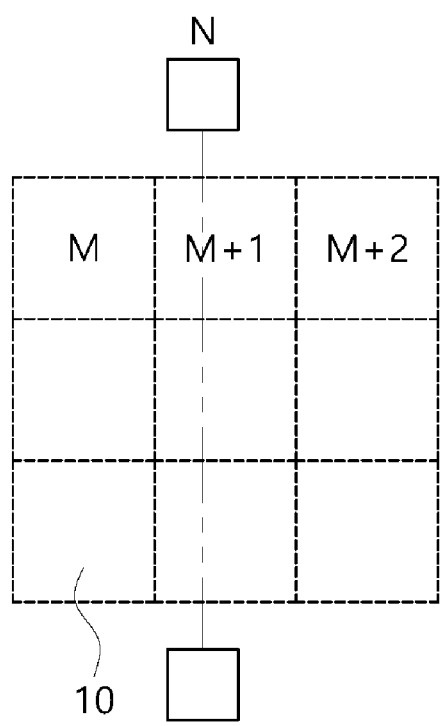
FIGS. 9A to 9C are schematic views illustrating the relationship between a virtual grid line and a virtual pixel separating line.
Figure 9B:
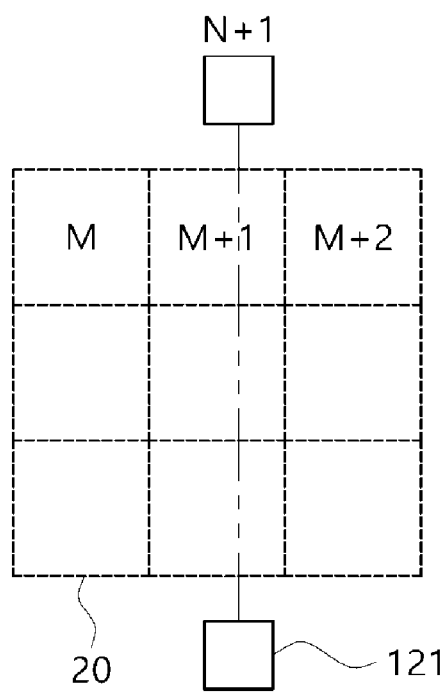
Figure 9C:
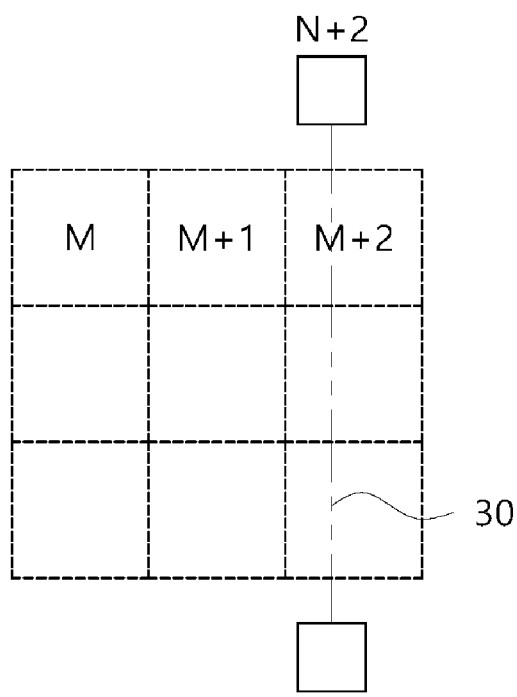

FIGS. 9A to 9C are conceptual views illustrating the relationship between a virtual grid line and a virtual pixel separating line.

Referring to FIGS. 9A to 9C, the virtual grid line 30 is generated based on an N-th protruding pattern 121, an (N+1)-th protruding pattern 121, and an (N+2)-th protruding pattern 121.

The image sensor package 100 is a package used to count cells using the image sensor array 110 already standardized in an image sensor field and the virtual grid line 30 already standardized in the field of counting cells. In other words, the size of the pixel 10 in the image sensor array 110 of the image sensor package 100 uses a size already standardized in the field of the image sensor array 110. For example, the size of the pixel 10 of the image sensor array 110 may be 1.12 μm, or 1.75 μm. Meanwhile, the distance between the virtual grid lines may be 1 μm, 2 μm, or 5 μm. Accordingly, the pixel separating line 20 and the virtual grid line 30 for separating the pixels 10 of the image sensor array 110 may not accurately overlap each other and may not be aligned with each other.

Referring to FIG. 9A, a virtual grid line 30 generated based on the N-th protruding pattern 121 is present on lines of pixels 10 positioned in an (M+1)-th column. In addition, referring to FIG. 9B, a virtual grid line 30 generated based on the (N+1)-th protruding pattern 121 is present on the lines of the pixels 10 in the (M+1)-th column. In addition, referring to FIG. 9C, a virtual grid line 30 generated based on the (N+2)-th protruding pattern 121 is present on lines of pixels 10 of an (M+2)-th column.

As illustrated in FIGS. 9A, 9B, and 9C, since the pixel separating line 20 to separate the pixels 10 on the image sensor array 110 from each other is not matched to the virtual grid line 30, two virtual grid lines 30 may be generated on one column of the pixels 10.

The pixel separating line 20 and the virtual grid line 30 are not matched to each other even when one virtual grid line is generated on one column of the pixels 10. Accordingly, when the position of the grid line is exactly determined, the position relationship between the fine particles 40, which are positioned across on the virtual grid line 30, and the virtual grid line 30 may be detected, and the fine particles 40 may be accurately counted.

In addition, as well as when one virtual grid line 30 is generated on one column of the pixels 10, when at least two virtual grid lines 30 are generated on one column of the pixels 10, the position of each grid line should be determined such that the fine particles 40 are accurately counted. Accordingly, the structure in which the position of the virtual grid line 30 is exactly determined is necessary to accurately count the fine particles 40. The above structure will be described in detail with reference to FIG. 10.

Figure 10A:
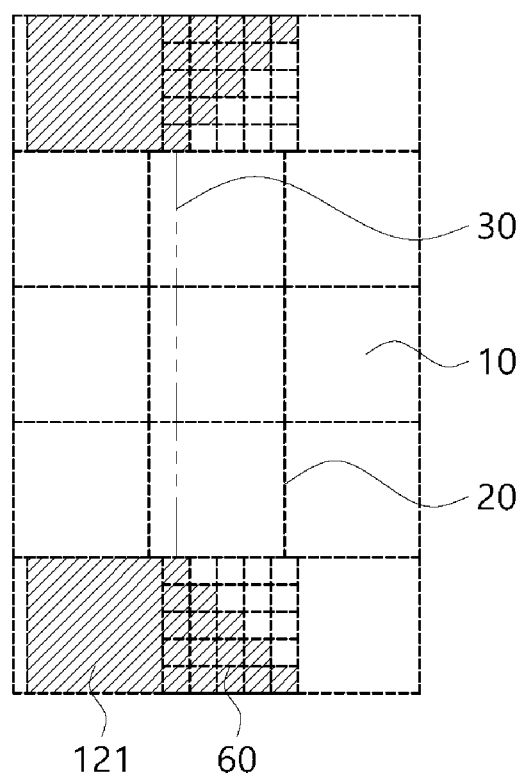
FIGS. 10A to 10C are views illustrating protruding patterns of grid pattern layers of FIGS. 4 and 5.
Figure 10B:
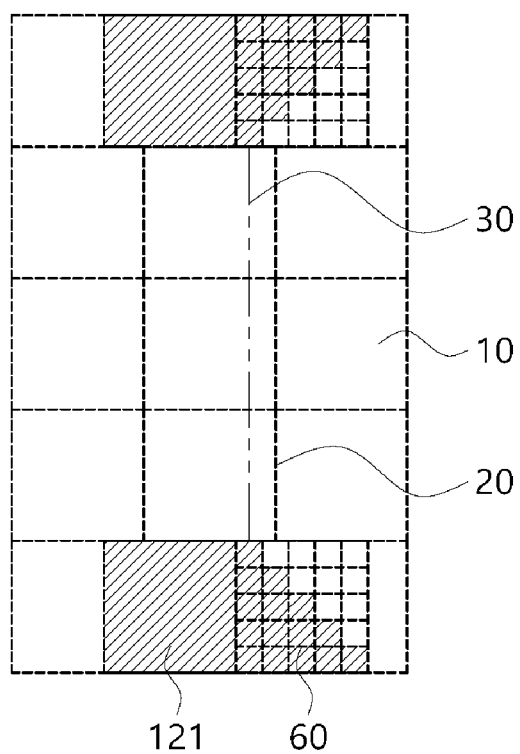
Figure 10C:
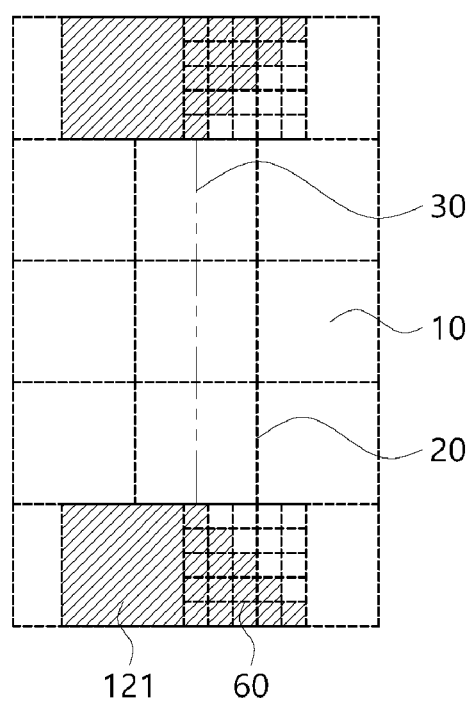

FIGS. 10A to 10C are views illustrating protruding patterns of grid pattern layers of FIGS. 4 and 5.

Referring to FIGS. 10A to 10C, the protruding pattern 121 of the grid pattern layer 120 includes a fine pattern 60 for correcting.

As described above in FIG. 9, to accurately count the fine particles 40, a structure for exactly determining the position of the virtual grid line 30 is required. The protruding pattern 121 of the grid pattern layer 120, which is used to form the virtual grid line 30, may have a square or rectangular shape. However, the protruding pattern 121 may include fine patterns 60 formed in a shape in which occupied areas are more reduced at specific distances such that a position of the virtual grid line 30 is more exactly determined. In other words, the determination of the position of the virtual grid line 30 may be corrected by the fine patterns 60. The area sizes, which are reduced at specific distances on the fine pattern 60 to correct the virtual grid line 30, are less than the widths of the pixels of the image sensor array 110. For example, the fine patterns 60, which are used to correct the virtual grid line 30, are formed in the shape of stairs having specific distances. In addition, the shape of the stair may have a distance obtained by dividing the pixel width of the image sensor array 110 by a specific division number (in FIG. 10, the pixel width is divided by five).

The light incident onto the image sensor array 110 of the image sensor package 100 may be more precisely detected by the fine pattern 60. For example, when a portion of the stair shape of the fine pattern 60 overlaps a pixel which is one pixel of the image sensor array 110, and when another portion of the stair shape of the fine pattern 60 overlaps a pixel which is another pixel of the image sensor array 110, the difference between the light incident onto the pixel and the light incident onto the pixel is detected, thereby detecting data for more exactly determining the position of the virtual grid line 30.

Figure 11:
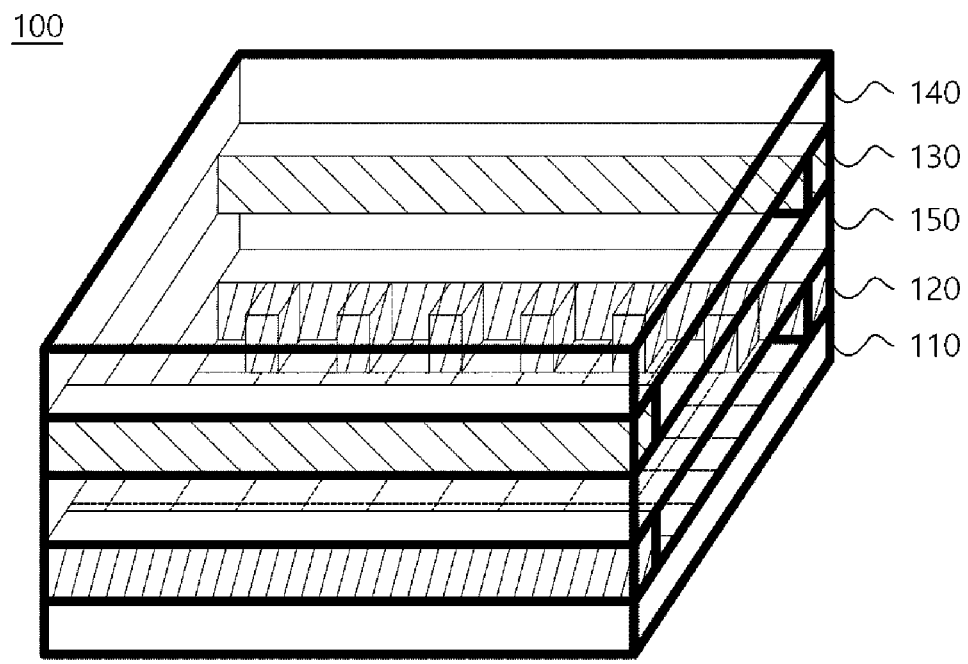
FIG. 11 is a perspective view schematically illustrating an image sensor package, in which a middle glass is added.
Figure 12:
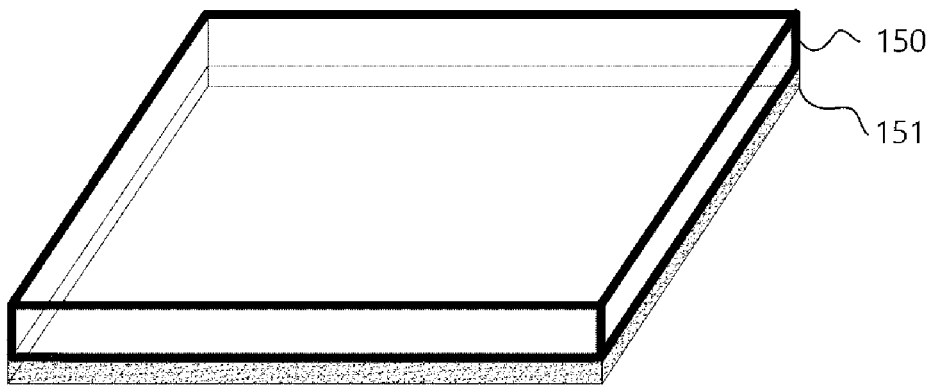
FIG. 12 is a schematic perspective view of a middle glass having a bottom surface coated with an optical filter.
Figure 13:
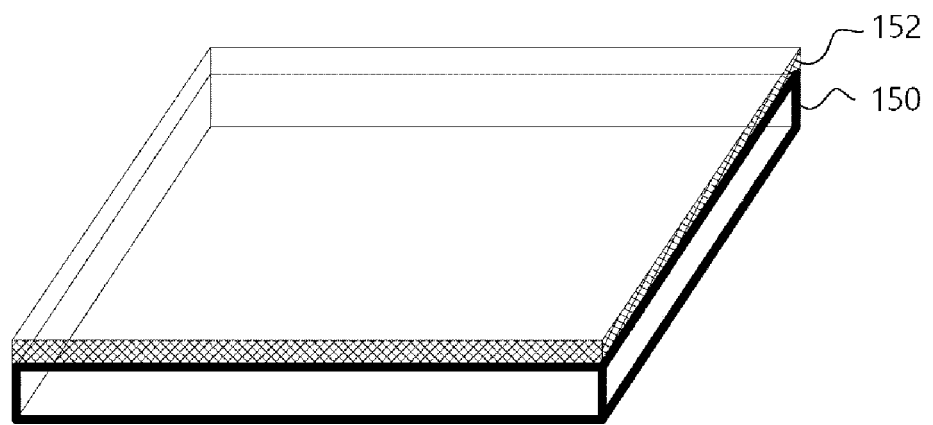
FIG. 13 is a schematic perspective view illustrating a middle glass having a surface formed by bio-treating a top surface of the middle glass.

FIG. 11 is a schematic perspective view illustrating an image sensor to which a middle glass is added, FIG. 12 is a schematic perspective view of a middle glass having a bottom surface coated with an optical filter, and FIG. 13 is a schematic perspective view illustrating a middle glass having a surface (bio-treated surface) formed by bio-treating a top surface of the middle glass.

Referring to FIG. 11, a middle glass 150 is interposed between the grid pattern layer 120 and the dam pattern layer 130 of the image sensor array 110. In addition, referring to FIG. 12, the middle glass 150 has a bottom surface, which faces the grid pattern layer 120, coated with an optical filter 151. In addition, referring to FIG. 13, a bio-treated surface 152 is formed on a top surface of the middle glass 150, which faces the dam pattern layer 130.

The middle glass 150 may be interposed between the grid pattern layer 120 and the dam pattern layer 130 of the image sensor package 100 and may have a thin thickness (for example, the thickness in the range of 150 to 200 μm). In other words, the image sensor package 100 has the structure in which the image sensor array 110, the grid pattern layer 120, the middle glass 150, the dam pattern layer 130, and the cover glass 140 are sequentially stacked.

The image sensor package 100 of the FIG. 1 has a channel or a chamber formed by the image sensor array 110, the grid pattern layer 120, the dam pattern layer 130, and the cover glass 140, and the fine particles 40 are injected or inserted into the channel or the chamber. Meanwhile, the image sensor package 100 having the middle glass 150 as in the FIG. 11 has a channel or a chamber formed by the middle glass 150, the dam pattern layer 130, and the cover glass 140, and the fine particles 40 are injected or inserted into the channel or the chamber.

The middle glass 150 of the image sensor package 100 may protect the image sensor array 110. For example, the middle glass 150 may protect the image sensor array 110 when the image sensor package 100 is cleaned such that the surface of the image sensor package 100 is managed. In addition, the middle glass 150 may protect the image sensor array 110 in the test of electro static discharge (ESD).

In addition, referring to FIG. 12, the middle glass 150 of the image sensor package 100 has a bottom surface facing the grid pattern layer 120 and coated with the optical filter 151. For example, the optical filter 151 may be a band pass filter (BPF), but the inventive concept is not limited thereto. The optical filter 151 of the middle glass 150 may be used such that the image sensor array 110 detects the fine particles 40 dye-treated. In other words, only light having a specific wavelength band of the dye-treated fine particles 40 is filtered by the optical filter 151, such that the image sensor array 110 detects light having the filter specific wavelength band.

In addition, the middle glass 150 of the image sensor package 100 may have the bio-treated surface 152 formed on the top surface facing the dam pattern layer 130. For example, the bio-treated surface 152 may be a layer treated with hydrophilicity/hydrophobicity, but the inventive concept is not limited thereto. The bio-treated surface 152 formed on the top surface of the middle glass 150 may allow liquids including the fine particles 40 be uniformly applied to the channel or the chamber of the image sensor package 100. In addition, the bio-treated surface 152 of the middle glass 150 may be used to capture DNAs injected or inserted into the channel or chamber of the image sensor package 100.

One of the optical filter 151 and the bio-treated surface 152, which are described above, may be applied onto the middle glass 150, or both the optical filter 151 and the bio-treated surface 152 may be applied to the middle glass 150.

Figure 14:
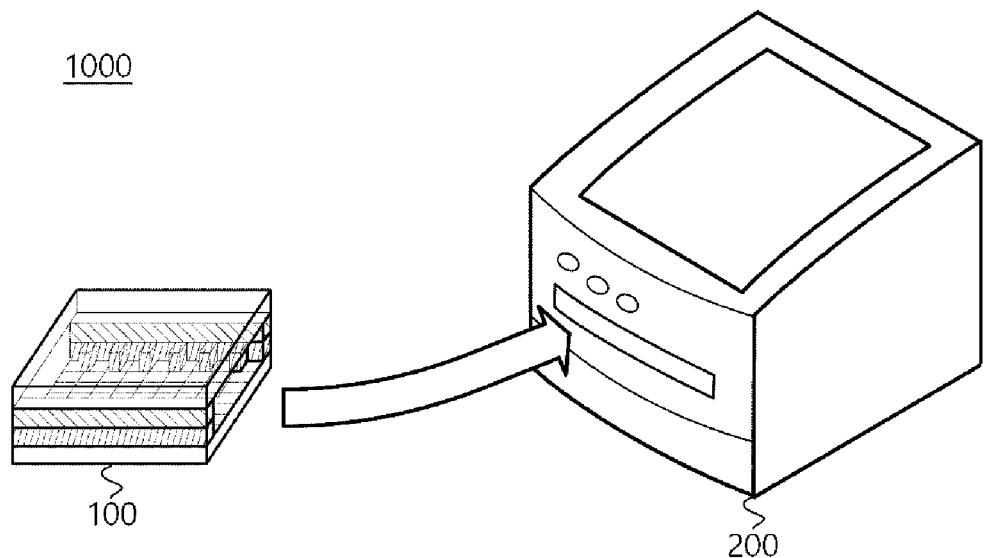
FIG. 14 is a conceptual view illustrating a system for counting fine particles, according to another embodiment of the inventive concept.

FIG. 14 is a conceptual view illustrating a system for counting fine particles, according to another embodiment of the inventive concept.

Referring to FIG. 14, the system 1000 for counting fine particles includes the image sensor package 100 and an image processing device 200.

The image sensor package 100 has a function and a configuration corresponding to a function and a configuration of the image sensor package 100 described with reference to FIGS. 1 to 13. Hereinafter, the duplicated description will be omitted.

The image processing device 200 is connected to the image sensor package 100 to receive an image of particles from the image sensor package 100, thereby processing and outputting data for counting the fine particles 40.

Figure 15:
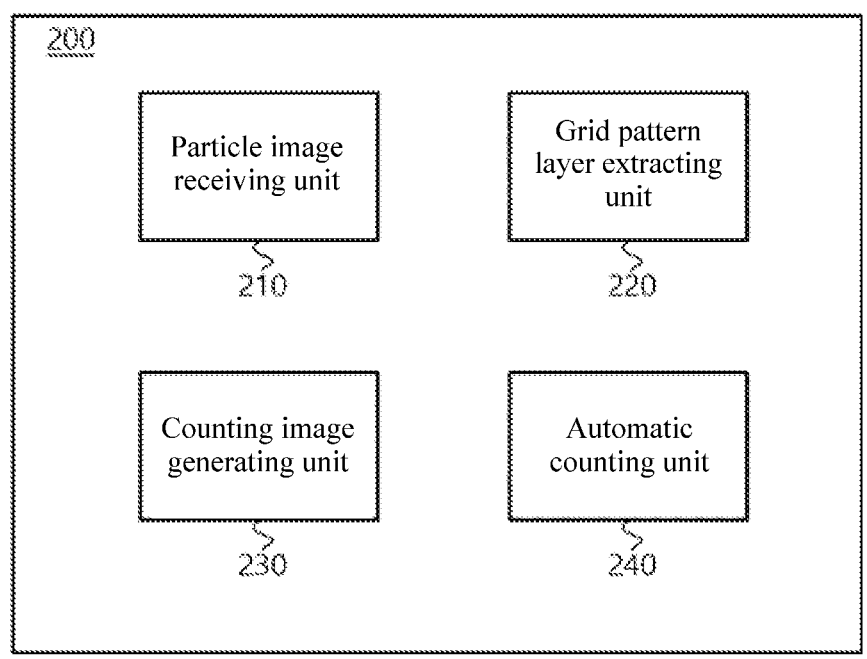
FIG. 15 is a block diagram schematically illustrating an image processing device of FIG. 14.

FIG. 15 is a block diagram schematically illustrating an image processing device of FIG. 14.

Referring to FIG. 15, the image processing device 200 includes a particle image receiving unit 210, a grid pattern layer extracting unit 220, a counting image generating unit 230, and an automatic counting unit 240.

The particle image receiving unit 210 receives a fine particle image (that is, data on the fine particle image) generated by the image sensor array 110. The fine particle image is generated based on data obtained by sensing the fine particle 40 through the image sensor package 100. The data obtained by sensing the fine particle 40 is data obtained by sensing light, which is incident onto the image sensor package 100, through the image sensor array 110 of the image sensor package 100. In detail, the data obtained by sensing the fine particle image includes data on light blocked by the fine particle 40 injected or inserted into the channel or the chamber of the image sensor package 100 and the grid pattern layer 120, or data on light transmitted at a specific proportion by the fine particle 40 and the grid pattern layer 120. The fine particle image may include data on the fine particle 40, the grid pattern layer 120, and other materials.

The grid pattern layer extracting unit 220 extracts the grid pattern layer 120 to form the virtual grid line 30 of the fine particle image. The grid pattern layer extracting unit 220 extracts the grid pattern layer 120, based on the shape data or the position data of the grid pattern layer 120 previously determined. In addition, the grid pattern layer extracting unit 220 may extract the fine pattern 60 of the grid pattern layer 120 by using the sensing data of the fine particle image.

The counting image generating unit 230 may determine, as a fine particle, an area having a specific difference or more from a reference value which is a value formed as light incident onto the image sensor package 100 is incident onto the image sensor array 110 without passing through the fine particle 40.

The counting image generating unit 230 generates a fine particle counting image by forming the virtual grid line 30 in the fine particle image, based on the grid pattern layer 120 to form the virtual grid line 30. The fine particle counting image is an image including the fine particle 40 and the virtual grid line 30. The system 1000 for counting the fine particles may provide the fine particle counting image to the user such that the user counts the fine particle 40, based on a specific reference. Alternatively, the fine particle counting image may be provided to the automatic counting unit 240, which is to be described later, such that the fine particles 40 is automatically counted by the automatic counting unit 240.

In addition, the counting image generating unit 230 may determine the position of the fine pattern 60 for correcting the virtual grid line, based on the grid pattern layer 120 to form the extracted virtual grid line 30. The counting image generating unit 230 may generate the fine particle counting image by forming the virtual grid line 30 in the fine particle image, based on the position of the fine pattern 60. The counting image generating unit 230, which is to be described later, may more exactly extract data on the position of the virtual grid line 30 by extracting the fine pattern 60.

The automatic counting unit 240 analyzes the fine particle counting image and counts the fine particles 40 present on a specific unit space (the above-described virtual grid area 50) defined by the virtual grid line 30.

The image processing device 200 may further include a controller, a communication device, storage, and a display. The controller may control each component of the image processing device 200. The communication device may transmit or receive data to another device from the image processing device 200. The storage may store data input, processed, and generated in image processing. The display may provide, to a user, data input into or output from the image processing device 200.

Figure 16:
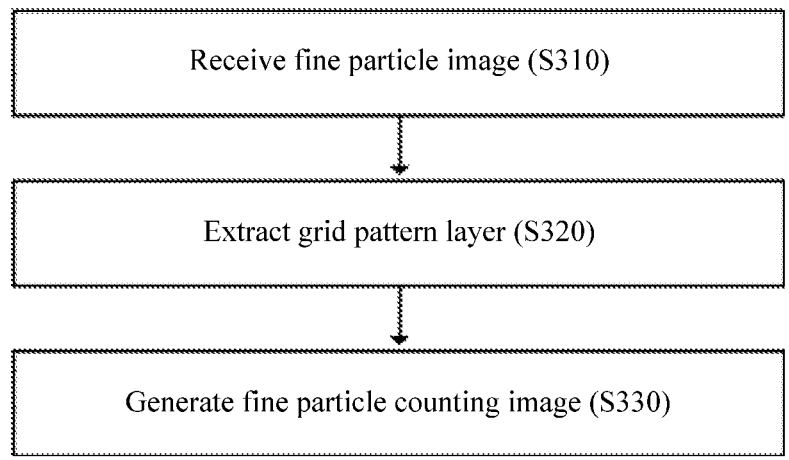
FIG. 16 is a flowchart schematically illustrating a method for counting fine particles, according to another embodiment of the inventive concept.

FIG. 16 is a flowchart schematically illustrating a method for counting fine particles, according to another embodiment of the inventive concept.

Referring to FIG. 16, the method for counting the fine particles includes receiving a fine particle image (S310), extracting a grid pattern layer (S320), and generating a fine particle counting image (S330).

The subjects of the behaviors for the method for counting the fine particles of FIG. 16 corresponds to some components of the image processing device 200 described with reference to FIG. 15. In other words, step S310 may be to perform the function or the operation of the particle image receiving unit 210, step S320 may be to perform the function or the operation of the grid pattern layer extraction unit 220, and step S330 may be to perform the function or the operation of the counting image generating unit 230. Hereinafter, the duplicated description of the method for counting the fine particle will be omitted.

In step S310, the fine particle image, which is generated by the image sensor package 100 including the image sensor array 110, the grid pattern layer 120, the dam pattern layer 130, and the cover glass 140, is received.

In step S320, the grid pattern layer 120 on the image sensor package 100 may be extracted based on the fine particle image.

In step S330, the fine particle counting image is generated by forming the virtual grid line 30 in the fine particle image, based on the extracted grid pattern layer 120.

Figure 17:
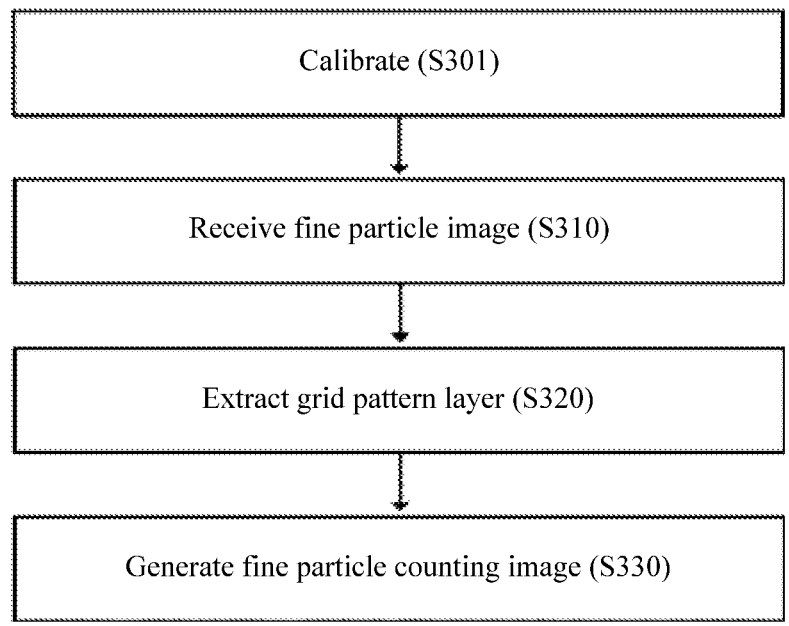
FIG. 17 is a schematic flowchart illustrating a method for counting fine particles, which further includes a calibrating step.

FIG. 17 is a schematic flowchart illustrating a method for counting fine particles, which further includes a calibrating step.

Referring to FIG. 17, the calibrating step (S301) is added before receiving the sensing data of the fine particle (S310).

In step S301, the calibrating operation is previously performed to determine the position of the grid pattern layer by receiving sensing data of the grid pattern layer.

That the calibrating operation is previously performed refers to performing a calibrating operation of forming the virtual grid line 30 before injecting or inserting the fine particles 40 into the image sensor package 100 and counting the fine particles.

The system 1000 for counting the fine particles determines the position of the grid pattern layer, based on data on light incident onto the image sensor package 100 into which fine particles are not injected or inserted. In other words, the light blocked by the grid pattern layer or transmitted at a specific proportion by the grid pattern layer is detected by the image sensor array 110, and the position of the grid pattern layer 120 is determined based on data on the detected light. The determining of the position of the grid pattern layer 120 refers to determining the position for forming the protruding part 121 of the grid pattern layer 120. The system 1000 for counting the fine particles may previously form the virtual grid line 30 based on the protruding part 1121 of the grid pattern layer 120 by determining the position for forming the protruding part 121 of the grid pattern layer 120.

Figure 18:
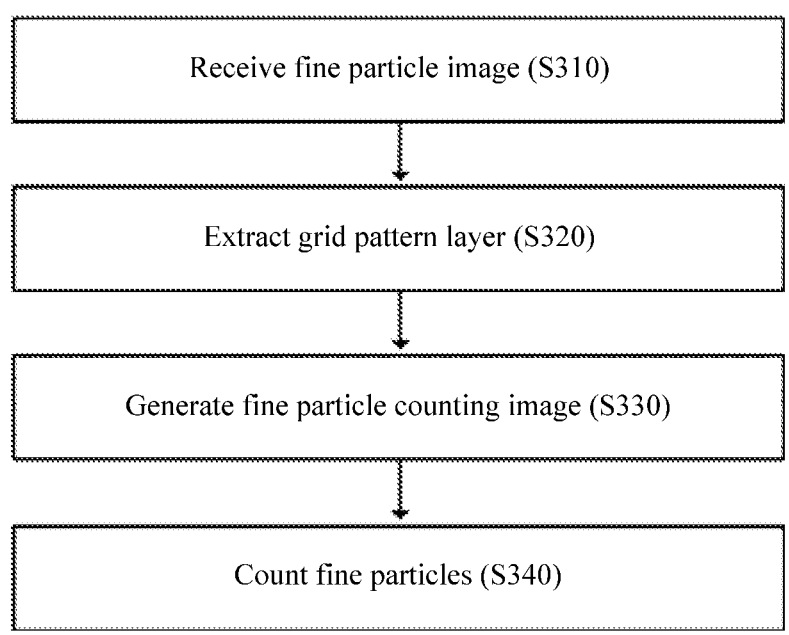
FIG. 18 is a flowchart schematically illustrating a method for counting fine particles, which further includes a step of automatically counting the fine particles.

FIG. 18 is a flowchart schematically illustrating a method for counting fine particles, which further includes a step of automatically counting the fine particles.

Referring to FIG. 18, the method for counting the fine particles, which further includes the step (S340) of automatically counting the fine particles further includes the step (S340) of counting the fine particles after generating the fine particle counting image (S330).

The subjects of the behaviors for the method for counting the fine particles of FIG. 18 correspond to some components of the image processing device 200 described with reference to FIG. 15. In other words, in step S340, the function or the operation of the particle image receiving unit 210 may be performed. Hereinafter, the duplicated description of the method for counting the fine particle will be omitted.

In step S340, the fine particles 40 present on the specific unit space or the virtual grid area 50 defined by the virtual grid line 30 are counted by analyzing the fine particle counting image.

The method or the algorithm steps described regarding the embodiment of the inventive concept may be implemented in hardware, and implemented with a software module executed by the hardware, or the combination of the software and the hardware. A software module may reside in a random access memory (RAM), a read only memory (ROM), an erasable programmable ROM (EPROM), an electrically erasable programmable ROM (EEPROM), a flash memory, a hard disk, a removable disk, a CD-ROM, or a computer readable recording medium well known in the art to which the inventive concept pertains.

According to the present disclosure, in the image sensor package, the system, and the method for counting fine particles by using the virtual grid line, the virtual grid line may be generated based on the protruding pattern of the grid pattern layer provided on the image sensor package, and the fine particle counting image may be generated to count the fine particles present on the virtual grid area defined by the virtual grid line.

In addition, the fine particles present on the virtual grid area may be automatically counted by analyzing the fine particle counting image.

In addition, the image sensor package may be fabricated through the semiconductor process, such that the process variation is remarkably reduced and the error is reduced in counting the cells, when compared to that the cell counter is manufactured through the injection-molding process or the molding process.

The effects of the inventive concept are not limited to the above, but other effects, which are not mentioned, will be apparently understood to those skilled in the art.

Although the embodiment of the inventive concept have been described with reference to accompanying drawings, those skilled in the art should understand that various modifications are possible without departing from the technical scope of the present invention or without changing the technical sprite or the subject matter of the inventive concept. Therefore, those skilled in the art should understand that the technical embodiments are provided for the illustrative purpose in all aspects and the inventive concept is not limited thereto.

While the inventive concept has been described with reference to embodiments, it will be apparent to those skilled in the art that various changes and modifications may be made without departing from the spirit and scope of the inventive concept. Therefore, it should be understood that the above embodiments are not limiting, but illustrative.

What is claimed is:

1. An image sensor package for counting fine particles by using a virtual grid line, the image sensor package comprising:
   an image sensor array;
   a grid pattern layer formed on an outer area of the image sensor array and including a plurality of protruding patterns spaced apart from each other by a specific distance while protruding toward a central area of the image sensor array to form a virtual grid line;
   a dam pattern layer formed on the grid pattern layer, having a specific height, and configured to form a channel or a chamber for receiving the fine particles to be counted; and
   a cover glass formed on the dam pattern layer,
   wherein the virtual grid line is used for counting fine particles.

2. The image sensor package of claim 1, wherein the protruding pattern of the grid pattern layer to form the virtual grid line includes:
   a fine pattern to correct the virtual grid line.

3. The image sensor package of claim 2, wherein the fine pattern to correct the virtual grid line is provided in a form in which an occupied area is gradually reduced at specific distances,
   wherein the fine pattern to correct the virtual grid line is provided in a shape of stairs formed at the specific distances, and
   wherein the specific distance is less than a pixel width of the image sensor array.

4. The image sensor package of claim 1, wherein the grid pattern layer to form the virtual grid line further includes:
   a body pattern formed in a rectangular shape on the outer area of the image sensor array,
   wherein the plurality of protruding patterns are formed to extend from the body pattern, and
   wherein the plurality of protruding patterns of the grid pattern layer to form the virtual grid line are formed to extend from at least one inner side surface of a plurality of inner side surfaces of the body pattern.

5. The image sensor package of claim 1, wherein the image sensor array is a lens-free image sensor array.

6. The image sensor package of claim 1, further comprising:
   a middle glass interposed between the grid pattern layer and the dam pattern layer is further included,
   wherein the middle glass has a bottom surface, which faces the grid pattern layer, coated with an optical filter, and
   wherein the middle glass has a top surface, which faces the dam pattern layer, bio-surface treated.

7. A system for counting fine particles by using a virtual grid line, the system comprising:
   an image sensor package configured to count the fine particles; and
   an image processing device,
   wherein the image sensor package to count the fine particles includes:

an image sensor array;
a grid pattern layer formed on an outer area of the image sensor array, and including a plurality of protruding patterns spaced apart from each other by a specific distance while protruding toward a central area of the image sensor array to form a virtual grid line;
a dam pattern layer formed on the grid pattern layer, having a specific height, and configured to form a channel or a chamber for receiving the fine particles to be counted; and
a cover glass formed on the dam pattern layer,
wherein the image processing device includes:
a particle image receiving unit to receive a fine particle image generated by the image sensor array;
a grid pattern layer extracting unit to extract the grid pattern layer to form the virtual grid line of the fine particle image; and
a counting image generating unit by forming the virtual grid line in the fine particle image, based on the grid pattern layer, which is to form the extracted virtual grid line, to generate a fine particle counting image.

8. The system of claim 7, wherein the protruding pattern of the grid pattern layer to form the virtual grid line includes:
a fine pattern to correct the virtual grid line.

9. The system of claim 8, wherein the fine pattern to correct the virtual grid line is provided in a form in which an occupied area is gradually reduced at specific distances,
wherein the fine pattern to correct the virtual grid line is provided in a shape of stairs formed at the specific distances, and
wherein the specific distance is less than a pixel width of the image sensor array.

10. The system of claim 8, wherein the grid pattern layer extracting unit extracts a fine pattern of the grid pattern layer by using sensing data of the fine particle image.

11. The system of claim 10, wherein the counting image generating unit forms the virtual grid line in the fine particle image, based further on the fine pattern of the grid pattern layer.

12. The system of claim 7, wherein the grid pattern layer to form the virtual grid line further includes:
a body pattern formed in a rectangular shape on the outer area of the image sensor array,
wherein the plurality of protruding patterns are formed to extend from the body pattern, and
wherein the plurality of protruding patterns of the grid pattern layer to form the virtual grid line are formed to extend from at least one inner side surface of a plurality of inner side surfaces of the body pattern.

13. The system of claim 7, wherein the image sensor array is a lens-free image sensor array.

14. The system of claim 7, further comprising:
a middle glass interposed between the grid pattern layer and the dam pattern layer,
wherein the middle glass has a bottom surface, which faces the grid pattern layer, coated with an optical filter.

15. The system of claim 14, wherein the middle glass has a top surface, which faces the dam pattern layer, bio-surface treated.

16. The system of claim 7, further comprising:
an automatic counting unit to count the fine particles in a specific unit space defined by the virtual grid line by analyzing the fine particle counting image.

17. A method for counting fine particles by using a virtual grid line, in which the fine particles is counted by using an image sensor package through a computer, the method comprising:
receiving a fine particle image generated by the image sensor package including an image sensor array, a grid pattern layer, a dam pattern layer, and a cover glass, wherein the grid pattern layer formed on an outer area of the image sensor array and including a plurality of protruding patterns spaced apart from each other by a specific distance while protruding toward a central area of the image sensor array to form a virtual grid line;
extracting the grid pattern layer on the image sensor package, based on the fine particle image; and
generating a fine particle counting image by forming a virtual grid line in the fine particle image, based on the extracted grid pattern layer.

18. The method of claim 17, further comprising:
previously performing a calibration operation to determine a position of the grid pattern layer, by receiving sensing data of the grid pattern layer.

19. The method of claim 18, further comprising:
counting the fine particles in a specific unit space defined by the virtual grid line by analyzing the fine particle counting image.

20. A computer program stored in a computer-readable recording medium connected to a computer to execute the method for counting the fine particles by using the virtual grid line according to claim 19.

* * * * *